United States Patent [19]

Hunter

[11] Patent Number: 4,462,927

[45] Date of Patent: Jul. 31, 1984

[54] BLOWING AGENT COMPOSITION CONTAINING ZINC FORMATE AND METAL SALT ACTIVATOR

[75] Inventor: Byron A. Hunter, Alpine, Utah

[73] Assignee: Uniroyal, Inc., New York, N.Y.

[21] Appl. No.: 559,115

[22] Filed: Dec. 7, 1983

Related U.S. Application Data

[62] Division of Ser. No. 524,945, Aug. 22, 1983.

[51] Int. Cl.$^3$ .............................................. C09K 3/00
[52] U.S. Cl. .................... 252/350; 521/92; 521/93; 521/85
[58] Field of Search ............... 252/350; 521/85, 92, 521/93

[56] References Cited

U.S. PATENT DOCUMENTS 3,639,649  2/1972  Mc Grath ........................... 521/93
3,986,989  10/1976  Freifeld et al. ..................... 521/93

FOREIGN PATENT DOCUMENTS 2148099  4/1973  Fed. Rep. of Germany .

OTHER PUBLICATIONS

Dolimare et al., Journal of Inorganic Nuclear Chemistry, p. 29, 621–627, 1967.
Djega—Mariadassou et al., Bulletin, Soc. Chim., France 9, 316-3173 (1971).

*Primary Examiner*—Morton Foelak
*Attorney, Agent, or Firm*—Andrew D. Maslow

[57] ABSTRACT

A blowing agent composition is provided comprising:
 (a) zinc formate, and
 (b) a compound having the formula $M_mX$, wherein M is sodium or potassium; X is chlorine, bromine, iodine, $CO_3$, $HCO_3$, $SO_4$, $SO_3$, $S_2O_3$, $NO_2$, SCN, OCN, $BO_2$, $HBO_3$, $HPO_4$, $PO_4$ or $H_2PO_4$, and m is an integer representing the valence of X; or a compound having the formula $M_n^1 R_p$, wherein $M^1$ is alkali metal, calcium, lead or zinc, R is organic mono- or polybasic acid having 1–18 carbon atoms and from 0 to 2 nitrogen atoms, or a benzenesulfonyl or toluenesulfonyl radical; and n and p are integers representing the valences of R and $M^1$, respectively or whole fractions thereof.

1 Claim, No Drawings

BLOWING AGENT COMPOSITION CONTAINING ZINC FORMATE AND METAL SALT ACTIVATOR

This is a division of application Ser. No. 524,945, filed Aug. 22, 1983.

The present invention relates to improved blowing agent compositions, their preparation and use.

When making an expanded material such as a foamed synthetic polymeric material, the polymeric material has conventionally been mixed with a blowing agent, such as azodicarbonamide or a hydrazodicarboxylate. The performance requirements of blowing agents have now become more and more critical and changes in the composition of blowing agents can have significant effects on the end product. The instant invention combines zinc formate and a metal salt activator as a blowing agent with improved performance characteristics.

Zinc formate decomposes within about 30 minutes at a temperature of 280° C. or higher and releases CO, $CO_2$, hydrogen and traces of methane. For most applications, i.e., the expansion of polymers, such temperatures are either too high or gas evolution is too slow, and therefore the use of zinc formate is considered impractical as a blowing agent in commerce.

It has now been unexpectedly found that the decomposition temperature of zinc formate may be lowered and/or the gas evolution accelerated or increased by the addition of the metal activators of the invention.

The use of zinc formate as a blowing agent is known in the prior art. British Pat. No. 1,567,417 discloses foamable polyester composition containing zinc formate. The patent teaches that such composition has improved flame retardant properties.

The thermal decomposition of zinc formate is well known. Dolimare et al, Journal of Inorganic Nuclear Chemistry, 29,621–627 (1967) teaches the decomposition behavior of zinc and manganous formates. Djega-Mariadassou et al, *Study of Decompositions Causing Simultaneous Release of Several Gases, IV,—Thermal Decomposition of Zinc Formate Dihydrate and Morphology of Zinc Oxide Residue,* Bull. Soc. Chim. France 9,316–3173 (1971) also describes the composition behavior of zinc formate and the role of zinc oxide formed during decomposition. German Publication (Offenlegungsschrift) No. 2,148,099, Apr. 12, 1973, teaches the expansion of thermoplastic polymers using neutral metal salts of formic and/or oxalic acid, and optionally, a stabilizer, such as a sodium phosphite is employed. None of the above prior art teach or suggest the combination of zinc formate and metal salt activators of the instant invention.

The compositions of this invention find general use in foaming any gas expandable polymeric material, especially those which are capable of setting to a normally solid state and having sufficient consistency and strength at the processing temperature (or to be enabled by virtue of the confining device) to retain the gas and preserve a cellular structure in the expanded product. The processing temperature will depend upon a number of factors, including the nature of the polymeric material and its visco-elastic properties, upon the forming equipment being used and upon the nature of the end product desired. In general, for most effective results one must obtain in the polymeric material being expanded a consistency and tensile strength sufficient to retain the individual micropores of gas as discrete cells, preventing coalescence to an undesirable coarse cell structure. This may generally be attained in the case of thermosetting resins by adjustment of the rate and state of cure to give the composition the desired viscosity and strength at gas forming temperature. In the case of thermoplastic resins, the desired consistency and strength will generally be achieved by adjusting the temperature until the proper viscosity is obtained. As the gas forming temperature will vary with the particular composition selected and may change with the composition selected and may change with the composition of the plastic mixture, it will be seen that the temperature employed may vary considerably with the particular application.

The polymer materials which may be used are any type of rubber which is curable or vulcanizable to a solid state, exemplified by natural rubber, or synthetic rubber-like or rubbery polymers of diolefins such as butadiene or isoprene, or their copolymers with such as styrene or acrylonitrile, and butyl rubbers, polymerized halo-diolefins, such as neoprene, polyvinyl chloride, polystyrene, etc., as well as ethylene-propylene copolymers and ethylene-propylene-non-conjugated diene terpolymer elastomers.

The blowing agent compositions are mechanically mixed with the polymeric materials and, if desired, other customary adjuvants, fillers, plasticizers, etc., may also be added, prior to heating the mixture to temperatures at which decomposition of the blowing agent takes place. The amount of the blowing agent composition may vary from 0.05 to 20%, the quantity used depending upon the application and the density desired. Usually 0.1 to 15% suffice, and ordinarily 1.0 to 10% are employed.

The new blowing agents of the invention are a combination of zinc formate and a metal activator which is a compound having the formula $M_nX$, wherein M is sodium or potassium; X is chlorine, bromine, iodine, $CO_3$, $HCO_3$, $SO_4$, $HSO_4$, $SO_3$, $S_2O_3$, $NO_2$, SCN, OCN, $BO_2$, $HBO_3$, $HPO_4$, $PO_4$ or $H_2PO_4$, and m is an integer representing the valence of X; or a compound having the formula $M_n^1 R_p$, wherein $M^1$ is alkali metal, calcium, lead or zinc, R is organic mon- or poly-basic acid having 1–18 carbon atoms and from 0 to 2 nitrogen atoms, or a benzenesulfonyl or toluenesulfonyl radical; and n and p are integers representing the valences of R and $M^1$, respectively or whole fractions thereof.

Preferred metal activators are those where M is Na or K; X is Cl, Br, $CO_3$, $HCO_3$, $SO_4$, $H_2PO_4$, $HPO_4$ or $PO_4$; $M^1$ is Na, K, Pb or Zn; R is OOCH, $OOCCH_3$, $OOCC_6H_5$ or ethylenediaminetetracetic acid; m, n and p are 1 or 2.

The weight ratio of zinc formate (ZF) to activator (ZF/Act) may be 99/1–2/1, preferably 50/1–2/1, most preferably 20/1–4/1.

The activators, and for that matter the zinc formate, may be used in their hydrated or dehydrated state. The blowing agent composition of this invention were evaluated for their gas evolution efficiency by certain testing methods as described in examples below. Testing method and results provide the practitioner with an easy means to predict suitability of certain activators or ZF/Act ratios for particular applications.

EXAMPLE 1

A dry blend of zinc formate (ZF) with various activators (ZF/Activator=4/1, weight) was thoroughly mixed in a mortar. 250 mg of the mix was weighed into a 25 ml heavy walled Erlenmeyer flask and the flask sealed with a rubber septum. The needle of an empty 100 ml graduate syringe was introduced by penetrating the septum, thus affording a tight seal. The flask, surmounted by the syringe was clamped in a vertical position above a preheated and mechanically stirred silicone bath. With a thermometer properly placed the bath was carefully raised to immerse the under portion of the flask in the hot fluid. The volume of gas evolved into the syringe was observed as indicated in Table I. The final volume of gas was read after the flask and syringe were cooled to room temperature. This volume was subsequently corrected to standard conditions—permitting the calculation of the volume of gas produced per gram of the blowing agent mixture and ZF alone under these conditions.

TABLE I

| Run No. | Activator | Temp. °C. | cc/g (Comp.) | cc/g (ZF) | Minutes |
|---|---|---|---|---|---|
| 1 | none | 288–300 | 255 | 255 | 9 |
| 2 | none | 283–285 | 261 | 261 | 30 |
| 3 | NaCl | 242–251 | 286 | 357 | 7.5 |
| 4 | NaBr | 196–222 | 283 | 354 | 32 |
| 5 | NaI | 222–231 | 279 | 347 | 24 |
| 6 | KCl | 211–220 | 295 | 370 | 13 |
| 7 | KBr | 208–224 | 307 | 384 | 12 |
| 8 | KCl + NaCl | 208–218 | 270 | 338 | 17 |
| 9 | NaHCO$_3$ | 129–235 | 285 | 356 | 13 |
| 10 | NaHCO$_3$ | 226–228 | 289 | 361 | 10 |
| 11 | NaHCO$_3$ | 242–243 | 286 | 357 | 6 |
| 12 | KHCO$_3$ | RT-231 | 279 | 348 | 11 |
| 13 | Na$_2$CO$_3$ | 215–218 | 216 | 270 | 15 |
| 14 | Na$_2$CO$_3$ | 221–228 | 234 | 290 | 10 |
| 15 | K$_2$CO$_3$ | 218–219 | 246 | 308 | 10 |
| 16 | Na$_2$SO$_4$ | 244–250 | 304 | 380 | 17 |
| 17 | NaNO$_2$ | RT-252 | 222 | 277 | 13 |
| 18 | KNO$_3$ | 220–228 | 225 | 281 | 13 |
| 19 | NaOCN | 218–219 | 248 | 310 | 12 |
| 20 | NaSCN | 214–219 | 247 | 310 | 18 |
| 21 | KOCN | 216–218 | 232 | 290 | 10 |
| 22 | KSCN | 220–227 | 283 | 354 | 8 |
| 23 | NaOOCCH$_3$ | 217–228 | 275 | 344 | 16.5 |

TABLE I-continued

| Run No. | Activator | Temp. °C. | cc/g (Comp.) | cc/g (ZF) | Minutes |
|---|---|---|---|---|---|
| 24 | Ca(OOCCH$_3$)$_2$ | 201–260 | 236 | 295 | 30 |
| 25 | Pb(OOCCH$_3$)$_2$ | 218–220 | 270 | 337 | 30 |
| 26 | Zn(OOCCH$_3$)$_2$ | 28–274 | 263 | 328 | 15 |
| 27 | Na$_2$ oxalate | 218–222 | 258 | 322 | 27 |
| 28 | Na$_2$ malonate | 218–224 | 211 | 264 | 15 |
| 29 | Na stearate | 208–233 | 254 | 318 | 35 |
| 30 | Na benzoate | 250–256 | 286 | 358 | 9 |
| 31 | Na SO$_2$C$_6$H$_4$-p-CH$_3$ | 216–219 | 218 | 273 | 17 |
| 32 | Na salicylate | 221–224 | 278 | 348 | 22 |
| 33 | Na, EDTA* | 216–217 | 264 | 330 | 26 |

*ethylenediaminetetraacetic acid

The results clearly indicate the surprising effect of the activators on zinc formate performance as blowing agent by either enhancing gas evolution, lowering decomposition temperature or increasing the rate of gas evolution, lowering decomposition temperature or increasing the rate of gas evolution or a combination of these phenomena.

EXAMPLE 2

Following essentially the procedure of Example 1, additional activators were evaluated as summarized in Table II. The weight ratios of ZF/activator were 4/1, except for zinc formate/Na butyrate (9/1), by weight (Run No. 38).

TABLE II

| | | | Gas evolution observed, cc | | | Gas, cc/g (final) based on | |
|---|---|---|---|---|---|---|---|
| Run No. | Activator | Temp. °C. | 5 min | 10 min | Final | Composition | ZF |
| 34 | K$_2$HPO$_4$ | 232–234 | 113 | — | 113 | 270.7 | 338.3 |
| 35 | K$_2$HPO$_4$ | 221–222 | 71.5 | 115 | 121 | 298.4 | 373.0 |
| 36 | K$_2$HPO$_4$ | 231–232 | 105 | 114 | 116 | 272.7 | 340.4 |
| 37 | Na$_2$HPO$_4$ | 222–240 | 38 | 78 | 113 | 276.5 | 345.5 |
| 38 | Na Butyrate | 229–230 | 71 | 118 | 138 | 369.9 | 411.0 |
| 39 | Na Formate | 232–227 | 118 | 132 | 134 | 350.0 | 437.4 |
| 40 | Na Formate | 217–218 | 68 | 112 | 119 | 315.0 | 394.0 |
| 41 | Na n-Hexoate | 231–232 | 96 | 131 | 135 | 333.2 | 416.5 |
| 42 | Na Propionate | 227–230 | 86 | 126 | 130 | 333.2 | 416.5 |
| 43 | Na Isobutyrate | 231–233 | 91 | 110 | 118 | 292.0 | 365.0 |
| 44 | Na-Octoate | 230–233 | 77 | 108 | 116 | 275.4 | 344.2 |
| 45 | K Propionate | 229–230 | 117 | — | 117 | 275.4 | 344.2 |
| 46 | K Propionate | 217–218 | 91 | 111 | 111 | 284.3 | 355.0 |
| 47 | K Hexoate | 216–217 | 73 | 112 | 118 | 324.9 | 406.1 |
| 48 | K Hexoate | 228–230 | 110.5 | — | 110.5 | 278.0 | 347.5 |
| 49 | K Octoate | 228–230 | 103 | — | 110 | 290.5 | 363.2 |
| 50 | Na Stearate | 229–230 | 62.5 | 99 | 106 | 312.0 | 390.0 |
| 51 | K Isobutyrate | 229–230 | 108 | 124 | 124 | 312.0 | 390.0 |
| 52 | K Stearate | 232–233 | 51 | 88 | 105.5 | 268.9 | 336.1 |
| 53 | K Laurate | 230–231 | 65 | 96.5 | 96.5 | 285.9 | 357.3 |

In each instance, the activators successfully increased gas evolution at a faster rate and at reduced temperature.

EXAMPLE 3

The effect of ZF/activator weight ratio was investigated following essentially the procedure of Example 1. The test temperature was held constant at 230° C., and gas evolutions were recorded at the intervals listed in Table III (all ratios being by weight).

TABLE III

Gas Evolutions on Mixtures of Zinc Formate and Postassium Carbonate

| | | Time at 230° C. (min) | | | | | | |
|---|---|---|---|---|---|---|---|---|
| Run No. | ZF/K$_2$CO$_3$ | ½ | 2 | 4 | 6 | 8 | 10 | 15 | 20 |
| 54 | ZF alone | 17.0 | 20.5 | 22.5 | 25.0 | 26.0 | 26.0 | 26.0 | 26.5 |

TABLE III-continued

Gas Evolutions on Mixtures of Zinc Formate and Postassium Carbonate

| Run No. | ZF/K$_2$CO$_3$ | Time at 230° C. (min) | | | | | | | |
|---|---|---|---|---|---|---|---|---|---|
| | | ½ | 2 | 4 | 6 | 8 | 10 | 15 | 20 |
| 55 | 99/1 | 13.0 | 23.0 | 32.0 | 40.0 | 48.0 | 57.0 | 77.0 | 97.0 |
| 56 | 98/2 | 16.0 | 27.0 | 42.0 | 61.0 | 76.5 | 90.0 | 110.0 | — |
| 57 | 95/5 | 20.0 | 35.0 | 62.0 | 90.0 | 110.0 | 110.0 | — | — |
| 58 | 90/10 | 22.0 | 51.0 | 94.0 | 112.0 | 113.0 | — | — | — |
| 59 | 80/20 | 21.0 | 58.0 | 88.0 | 96.0 | 98.0 | — | — | — |

It is noted that at ZF/K$_2$CO$_3$ ratios of 80/20-98/2 exceptionally good results are achieved.

EXAMPLE 4

Following the procedure of Example 3, the effect of ZF/Na$_2$CO$_3$ weight ratio was observed. The test results are summarized in Table IV.

TABLE IV

Gas Evolutions on Mixtures of Zinc Formate and Sodium Carbonate

| Run No. | ZF/Na$_2$CO$_3$ | Time at 230° C. (min) | | | | | | | |
|---|---|---|---|---|---|---|---|---|---|
| | | ½ | 2 | 4 | 6 | 8 | 10 | 15 | 20 |
| 60 | ZF alone | 17.0 | 20.5 | 22.5 | 25.0 | 26.0 | 26.0 | 26.0 | 26.5 |
| 61 | 99/1 | 12.0 | 18.0 | 21.0 | 27.5 | 32.0 | 39.0 | 52.0 | 61.0 |
| 62 | 95/5 | 18.0 | 27.0 | 40.0 | 59.6 | 81.0 | 98.0 | 131.0 | — |
| 63 | 90/10 | 19.0 | 39.0 | 69.0 | 102.0 | 127.0 | 140.0 | 143.0 | — |
| 64 | 85/15 | 20.0 | 40.0 | 71.0 | 99.0 | 116.0 | 124.0 | 134.0 | 137 |
| 65 | 80/20 | 25.0 | 49.0 | 78.0 | 96.0 | 108.0 | 113.0 | 114.0 | — |
| 66 | 70/30 | 22.0 | 43.0 | 59.0 | 69.0 | 73.0 | 75.0 | 77.0 | — |

The data indicate that gas evolution rates of ZF are considerably enhanced at ZF/activator ratios of 80/20 to 95/5.

EXAMPLE 5

Temperature has a considerable effect on the rate of gas evolution and the total amount of gas released. A mixture of ZF (90%) and K$_2$CO$_3$ (10%) was chosen for these experiments which were conducted essentially in the manner described in Example 1. The resuls are listed in Table V.

TABLE V

| Run No. | 67 | 68 | 69 | 70 |
|---|---|---|---|---|
| Temperature, °C.: | 228 | 216 | 212 | 209 |
| Time (Minutes) | Gas Evolution, cc | | | |
| 2 | 48 | 33 | 30 | 22 |
| 5 | 97 | 57 | 48 | 28 |
| 10 | 114 | 100 | 79 | 50 |
| 15 | 114 | 108 | 104 | 76 |

EXAMPLE 6

High density polystyrene (Dow Styron [trademark] 6087; 100 parts by weight) was expanded by mixing it with various blowing agent compositions (see Table VI; 0.3 parts) by injection molding the mixture in a Negri Bossi [trademark] (Model No. V17-110FA) injection molding machine under the following conditions:

Barrel temperature—Front: 232° C. middle: 221° C.; rear: 216° C.
Mold cavity temperature: 21° C.
Screw Speed: 60 rpm
Injection pressure: ca. 10 mPa
Back pressure: ca. 1.0 mPa
Cooling cycle: 47 seconds
Screw forward: 10 seconds The blend was injected into a mold having these dimensions: 11.43 cm × 11.43 cm × 0.635 cm. The results are provided in Table VI (Run No. 10 is outside the invention).

The blowing agent compositions (BAC) used are identified as follows:

A = ZF and KCl; B = ZF and NaHCO$_3$; C = ZF and NaOOCH.

ZF/Act ratio: 4/1 (weight) in all instances.

TABLE VI

| Run No. | 70 | 71 | 72 | 73 |
|---|---|---|---|---|
| BAC | none | A | B | C |
| Density, g/cm$^3$ | 1.162 | 0.757 | 0.790 | 0.830 |
| D. Red,$^{(1)}$, % | nil | 35 | 32 | 29 |
| Cell structure | — | fine | fine | fine |
| Cell uniformity | — | good | good | good |
| Surface | smooth | smooth | smooth | smooth |
| Color$^{(2)}$ | wh | gr | wh | wh |

Remarks:
$^{(1)}$D. Red = density reduction
$^{(2)}$Color: wh = white, gr = gray

What is claimed is:
1. A blowing agent composition comprising
   (a) zinc formate, and
   (b) a compound having the formula M$_m$X, wherein M is sodium or potassium; X is chlorine, bromine, iodine, CO$_3$, HCO$_3$, SO$_4$, SO$_3$, S$_2$O$_3$, NO$_2$, SCN, OCN, BO$_2$, HBO$_3$, HPO$_4$, PO$_4$ or H$_2$PO$_4$, and m is an integer representing the valence of X; or a compound having the formula M$_n^1$ R$_p$, wherein M$^1$ is alkali metal, calcium, lead or zinc, R is organic mono- or polybasic acid having 1–18 carbon atoms and from 0 to 2 nitrogen atoms, or a benzenesulfonyl or toluenesulfonyl radical; and n and p are integers representing the valences of R and M$^1$, respectively or whole fractions thereof.

* * * * *